(12) United States Patent
DeHart

(10) Patent No.: US 9,226,445 B2
(45) Date of Patent: Jan. 5, 2016

(54) SYSTEM FOR COLLECTING LAWN WASTE

(71) Applicant: Damon H. DeHart, Bedford, MA (US)

(72) Inventor: Damon H. DeHart, Bedford, MA (US)

( * ) Notice: Subject to any disclaimer, the term of this patent is extended or adjusted under 35 U.S.C. 154(b) by 2 days.

(21) Appl. No.: 14/192,030

(22) Filed: Feb. 27, 2014

(65) Prior Publication Data

US 2015/0237800 A1 Aug. 27, 2015

(51) Int. Cl.
*A01D 43/063* (2006.01)
*A01D 43/06* (2006.01)

(52) U.S. Cl.
CPC ............ *A01D 43/0636* (2013.01); *A01D 43/06* (2013.01)

(58) Field of Classification Search
USPC ...................................... 56/5, 194, 202, 16.6
See application file for complete search history.

(56) References Cited

U.S. PATENT DOCUMENTS

| | | | | |
|---|---|---|---|---|
| 2,862,346 A | * | 12/1958 | Anderson | ........................ 56/194 |
| 3,393,500 A | * | 7/1968 | MacLeod et al. | ................ 56/202 |
| 3,499,275 A | * | 3/1970 | Lozen | ............................. 56/202 |
| 3,583,137 A | * | 6/1971 | Lozen | ............................. 56/194 |
| 3,881,304 A | * | 5/1975 | Lempke | .......................... 56/202 |
| 3,934,392 A | * | 1/1976 | Moery et al. | ..................... 56/202 |
| 3,987,606 A | * | 10/1976 | Evans | ............................ 56/13.4 |
| 4,142,351 A | * | 3/1979 | Neice et al. | ..................... 56/202 |
| 5,125,222 A | * | 6/1992 | Speier | ............................ 56/202 |
| 6,546,710 B1 | | 4/2003 | DeHart | |
| 2012/0177306 A1 | | 7/2012 | DeHart | |

* cited by examiner

*Primary Examiner* — Alicia Torres
(74) *Attorney, Agent, or Firm* — Kriegsman & Kriegsman

(57) ABSTRACT

A lawn waste collection system is designed to be removably coupled to a side-discharge, riding lawn mower in order to assist in the collection of leaves, The collection system includes an oversized collection bag for retaining a large quantity of lawn waste, an adapter kit for connecting the collection bag to the mower, and a shield coupled to the mower for supporting and protecting the collection bag. The adapter kit includes a multi-sectioned chute, which establishes a discharge communication path between the mower and the collection bag, and a frame for retaining the chute, collection bag, and shield. As a feature of the invention, the chute includes a primary section comprising a flexible outer layer, which universally connects to a wide variety of mower blade decks over the discharge exit port, and an initially planar, rigid inner layer affixed to the outer layer to provide structural reinforcement,

4 Claims, 15 Drawing Sheets

SYSTEM FOR COLLECTING LAWN WASTE

FIELD OF THE INVENTION

The present invention relates generally to the collection of lawn waste, such as grass clippings, leaves and the like, and, more particularly, to lawn waste collection systems adapted for use with motorized lawn equipment.

BACKGROUND OF THE INVENTION

The collection of leaves is traditionally achieved using rakes, blowers or other handheld items. In certain environments that are replete with leaves, the use of handheld items to gather leaves renders the collection process burdensomely time-consuming and laborious.

Accordingly, lawn mowers and other similar types of motorized lawn equipment, such as mulchers, chippers and vacuums, are often utilized to assist in the collection of leaves. Specifically, by advancing the lawn mower over the desired area, the mower blade shreds, or mulches, the leaves and discharges the resultant debris into a designated collection bag, or bin, in communication with the mower.

Although the use of traditional lawn mowers has been found to facilitate the collection of leaves, the limited size of the designated collection bag requires frequently unloading of debris retained therein, particularly in environments that are heavily covered with leaves. This frequent unloading of the retained matter renders the entire collection process significantly more time-consuming and highly disruptive.

Accordingly, it is known in the art for oversized leaf collection bags to be used in place of the limited sized collection bag, or bin, typically designated for use with a particular piece of motorized lawn equipment, such as mowers. Due to the enlarged size of the collection bag, the leaves can be collected without stopping frequently to empty collected matter.

For example, in U.S. Pat. No. 6,546,710 to D. DeHart, the disclosure of which is incorporated herein by reference, there is provided a grass and leaf catcher for use with a riding mower that is in the form of a large bag of flexible material having a generally conical shape. The bag has an opening around its first end and another at the second end. The opening at the first end is generally circular, with a drawstring to facilitate attachment around the discharge tube and hood of the mower. A cleat in proximity to the opening allows for securing the drawstring. The opening at the second end is likewise secured by a drawstring and cleat combination, or by a hook-and-loop fastener. A mesh area in the surface of the bag relieves the pressure within the bag caused by the entry of air forced up the discharge tube by the action of the cutter blades of the mower.

Oversized collection bags of the type as described above are most commonly connected to a typical riding mower by mounting the enlarged opening of the bag directly over the hood on the rear of the mower that is ordinarily provided to support the plastic collection bin, the bin being removed in this situation so as not to interfere with the bag. The remainder of the bag is thus disposed to drag behind the mower on the lawn surface.

Oversized collection bags of the type as described above have been found to suffer from a pair of notable drawbacks.

As a first drawback, oversized collection bags of the type as described above are generally incapable of being mounted onto a riding mower that does not include the plastic collection bin accessory. As a result, a user who did not originally purchase the mower with the collection bin must subsequently purchase the plastic collection bin accessory, typically at a substantial cost. Otherwise, the user is precluded from using the collection bag with the mower.

As a second drawback, oversized collection bags of the type as described above are designed to drag behind the mower on the ground surface, which is often roughened with presence of rocks, gravel and the like. As a result, it has been found that collection bags often wear prematurely or become punctured or damaged as a result of the direct frictional contact against the ground surface.

Adapters are known in the art to assist in the connection of oversized collection bags to conventional riding lawn mowers that do not include a rear collection bin. These types of adapters are typically connected directly to the blade deck on the underside of the riding lawn mower, rather than to fixed structures. n the rear of the mower. Although useful, these types of adapters have been found to suffer from a plurality of notable drawbacks.

As a first drawback, adapters for connecting an oversized collection bag to the blade deck of a conventional riding mower are typically constructed out of a relatively rigid material for durability purposes. As a result of their rigid construction, these types of adapters are incapable of universal usage. Rather, each adapter is typically designed for use with a single style of mower, thereby necessitating the manufacture of a uniquely dimensioned adapter for each of the large variety of different mowers currently on the market.

As a second drawback, adapters for connecting an oversized collection bag to the blade deck of a conventional riding mower are not only difficult to install but also require the attachment of additional support structures (e.g., an auxiliary support) to the mower deck.

As a third drawback, adapters for connecting an oversized collection bag to the blade deck of a conventional riding mower typically include a plurality of components, many of which are substantial in size. As a result, the packaging for these types of adapters is relatively large, which not only introduces display and storage issues at the point-of-sale but also substantially increases shipping costs, which is highly undesirable.

BRIEF SUMMARY OF THE INVENTION

It is an object of the present invention to provide a new and improved system for collecting lawn waste, such as leaves, grass clippings and the like.

It is another object of the present invention to provide a lawn waste collection system of the type as described above that can be connected to the waste discharge port of a piece of motorized lawn equipment, such as a riding lawn mower.

It is yet another object of the present invention to provide a lawn waste collection system of the type as described above that requires limited, infrequent emptying of collected debris.

It is still another object of the present invention to provide a lawn waste collection system of the type as described above that has a universal construction and, as such, can be used with a wide variety of different types and styles of motorized lawn equipment.

It is yet still another object of the present invention to provide a lawn waste collection system of the type as described above that has a limited number of components, is inexpensive to manufacture, is easy to install, is durable in nature, and can be compactly packaged.

Accordingly, as a principal feature of the present invention, there is provided for use with a lawn mower to collect lawn waste, the lawn mower including an opening through which lawn waste is discharged, the lawn waste collection system comprising (a) a collection bag adapted to retain lawn waste discharged from the lawn mower, and (b) an adapter kit adapted to connect the collection bag to the opening in the lawn mower, the adapter kit comprising (i) a discharge chute for establishing a lawn waste discharge path from the lawn mower to the collection bag, the discharge chute having a first end and a second end, and (ii) a frame adapted to be fixedly coupled to the mower for supporting the discharge chute and the collection bag, (iii) wherein the first end of the discharge chute includes an outer layer adapted to mount on the lawn mower over the opening and an inner layer affixed to the outer layer for reinforcement, the outer layer being more flexible than the inner layer.

Various other features and advantages will appear from the description to follow. In the description, reference is made to the accompanying drawings which form a part thereof, and in which is shown by way of illustration, various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE INVENTION

Lawn Waste Collection System 11

Figure 1:
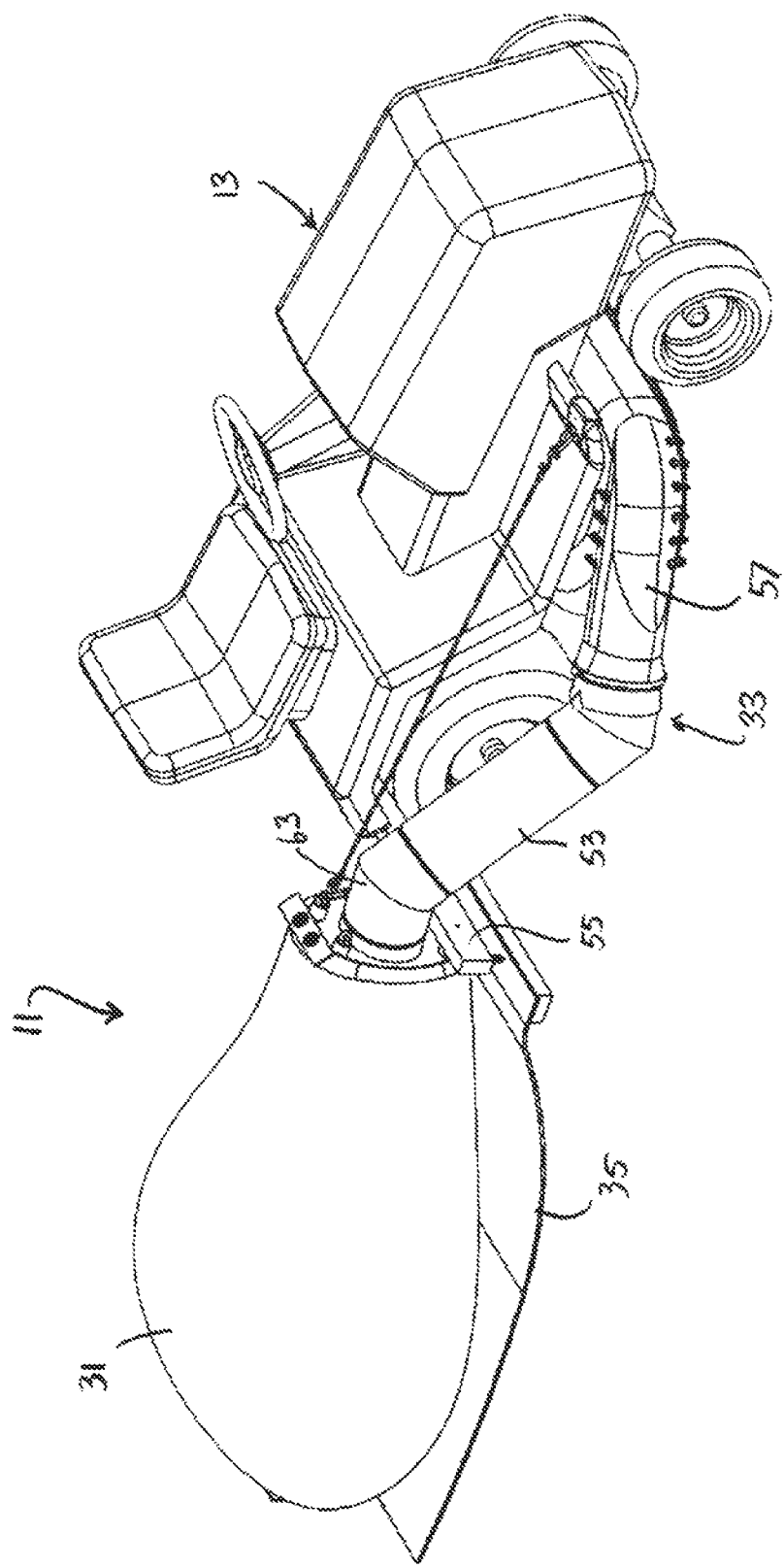
FIG. 1 is a front perspective view of a lawn waste collection system constructed according to the teachings of the present invention, the lawn waste collection system being shown mounted on a riding lawn mower that is known in the art.
Figure 2:
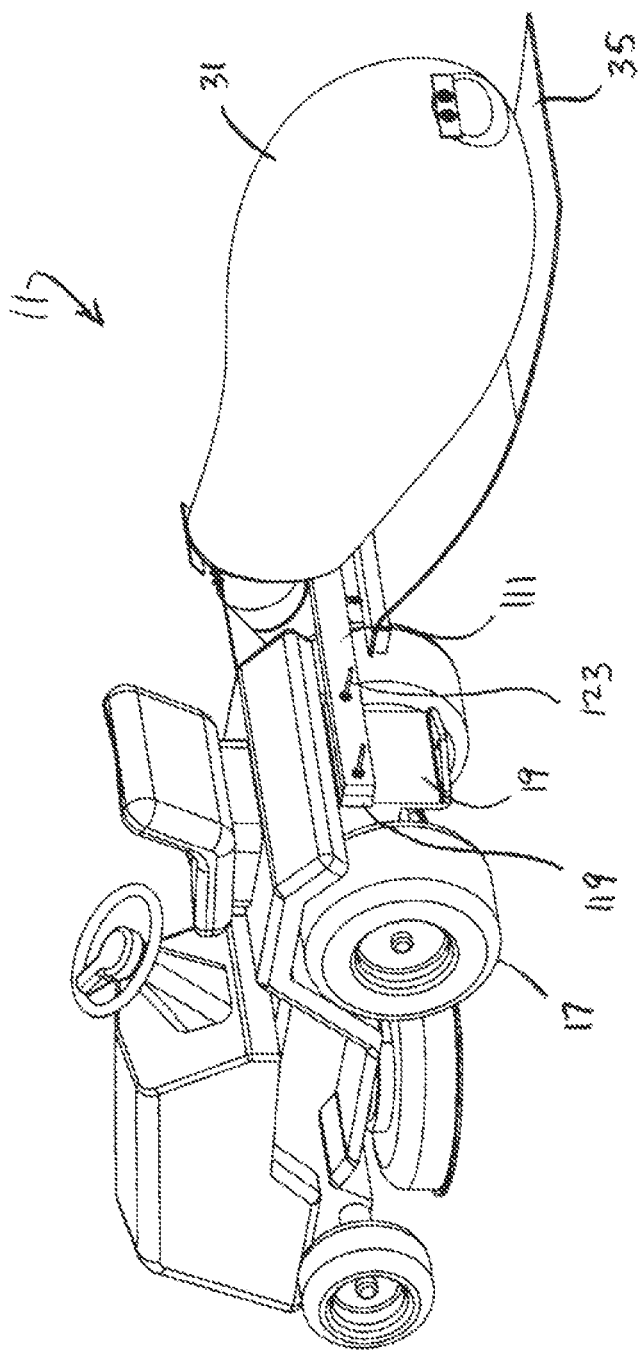
FIG. 2 is a rear perspective view of the lawn waste collection system and prior art riding lawn mower shown in FIG. 1.

Referring now to FIGS. 1 and 2, there is shown a lawn waste collection system constructed according to the teachings of the present invention, the system being identified generally by reference numeral 11. As will be described in detail below, system 11 is designed to securely and reliably collect a substantial quantity of lawn waste, such as leaves, grass clippings and the like, that is discharged from a conventional piece of lawn equipment.

For exemplary purposes only, system 11 is described herein as being adapted for use with a side-discharge, riding lawn mower 13. However, it should be noted that system 11 is not limited for use any particular style of lawn mower. Rather, it is to be understood that system 11 could be similarly utilized with alternative styles of lawn mowers, such as side-discharge push mowers, as well as different types of motorized lawn equipment, such as chippers, vacuums and mulchers, without departing from the spirit of the present invention.

It should be noted that for simplicity purposes, only the particular components of mower 13 that directly relate to the design, mounting and functionality of system 11 are described in detail herein. As seen most clearly in FIG. 3, mower 13 comprises a main body 15 that is supported by a plurality of motor-driven wheels 17.

Mower 13 additionally includes a back plate 19 that is fixedly mounted on the rear of body 15 between the rear pair of wheels 17. Back plate 19 is in the form of an enlarged, flattened member that is generally L-shaped in longitudinal cross-section. As can be seen, back plate 19 includes a plurality of preformed holes that are provided primarily to facilitate the connection of accessories (e.g., a limited volume, plastic collection bin) to mower 13.

Mower 13 further includes a blade deck 21 that is fixedly mounted onto the underside of body 15 between wheels 17. Blade deck 21 is constructed as a rigid and durable shroud that includes a generally flattened top wall 23 secured to the underside of body 15 and a rounded sidewall 25 that extends downward from the periphery of top wall 23. The free end of sidewall 25 terminates into a flat, horizontal, continuous lip, or flange, 27.

Together top wall 23, sidewall 25 and lip 27 define an interior cavity that receives rotatable, motor-driven mower blades (not shown). An arcuate discharge opening 29 is formed in the side of sidewall 25 and serves as an exit port through which lawn waste cut and mulched by the mower blades is ejected.

Referring back to FIGS. 1 and 2, lawn waste collection system 11 comprises an enlarged collection ball 31 for retaining lawn waste discharged by mower 13, an adapter kit 33 for connecting collection bag 31 to mower 13, and a shield 35 coupled to mower 13 for supporting and protecting collection bag 31, the details of each component to be provided below.

Collection Bag 31

As referenced briefly above, collection bag 31 is designed to retain lawn waste discharged by mower 13. Due to its considerable size, collection bag 13 is designed to receive a substantial amount of lawn waste discharged by mower 13 and thereby limit the frequency in which collected debris needs to be emptied, which is a principal object of the present invention.

Figure 4:
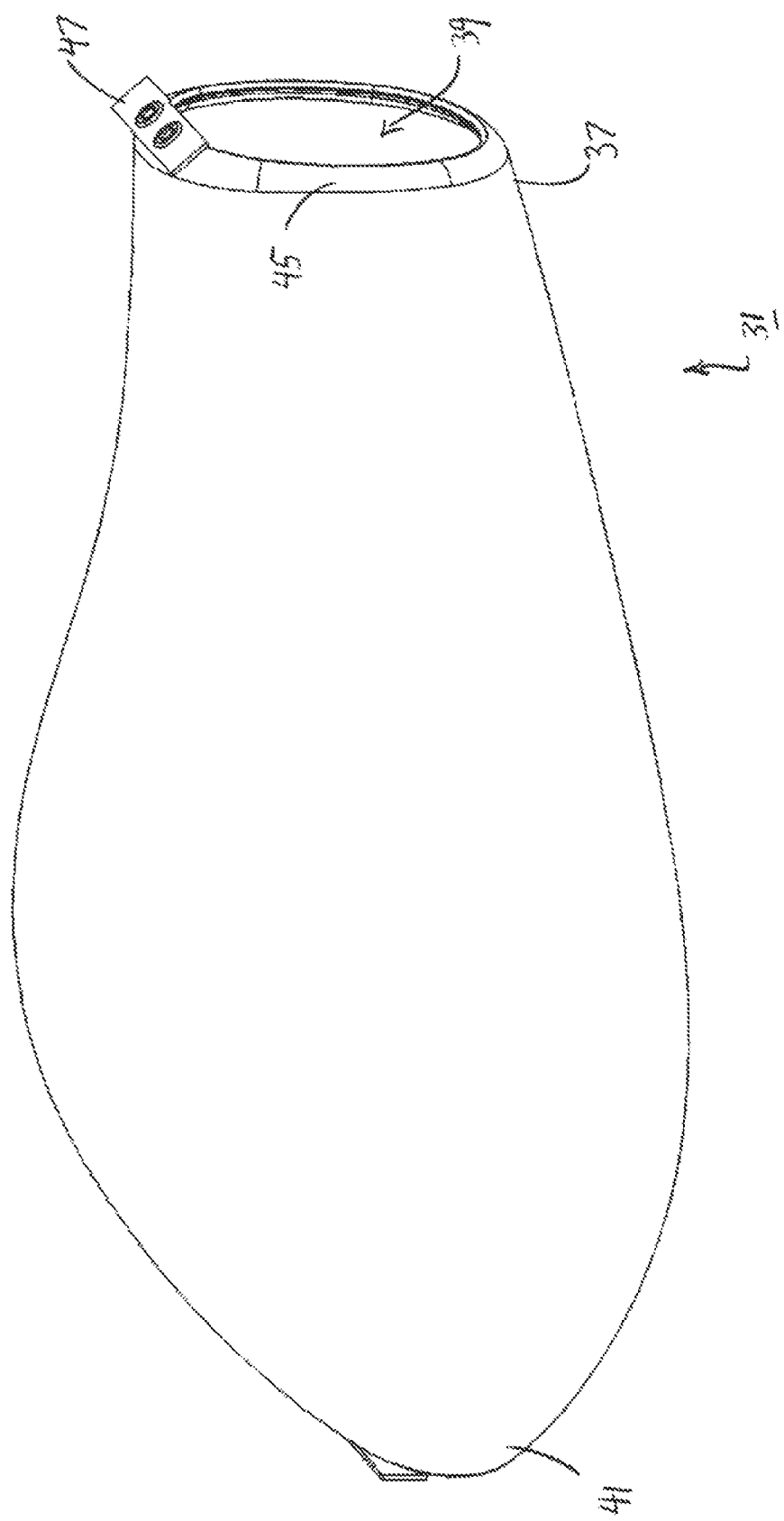
FIG. 4 is an enlarged, front perspective view of the collection bag shown in FIG. 1.

Collection bag 31 is preferably of the type disclosed in either U.S. Pat. No. 6,546,710 to D. DeHart or U.S. Patent Application Publication No. 2012/0177306 to D. DeHart, both of the aforementioned disclosures being incorporated herein by reference. Specifically, as seen most clearly in FIGS. 4 and 5, collection bag 31 is preferably in the form of an enlarged, deformable bag constructed out of a light and flexible, yet durable, material, such as an impervious polyethylene fabric or a pervious (i.e., breathable) polyester fabric.

Bag 31 has an elongated, sack-type construction with a first end 37 shaped to define a reduced-sized, selectively enclosable, primary opening 39 and a second end 41 shaped to define a enlarged, selectively enclosable, secondary opening 43. Although not shown herein, bag 31 may additionally include a meshed vent, or window, between openings 39 and 43 to facilitate the escape of air pressure directed into the interior of bag 31 from activation of mower 13 (i.e., from airflow generated by the fan-like rotation of the mower blades).

It should be noted that bag 31 is not limited to the particular construction set forth in detail above. Rather, it is to be understood that bag 31 could be alternatively constructed (e.g., to include a single opening) without departing from the spirit of the present invention.

Primary opening 39 is dimensioned to circumferentially fit over a component of adapter kit 33 and thereby serves as the principal path through which debris is deposited into the interior of bag 31, as will be explained further below. A primary cinch cord (not shown) ex ends within a hem, or reinforced channel, 45 formed in bag 31 around the periphery of primary opening 39, as seen most clearly in FIG. 4. By pulling upon the externally accessible free ends of the primary cinch cord, the diameter of primary opening 39 can be reduced so as to secure bag 31 in place. The drawstring can then be retained in its pulled state by winding the free ends tightly around an enlarged rectangular cleat 47 affixed to collection bag 13 in close proximity to hem 45.

Secondary opening 43 is of an enlarged size and is provided, inter alia, to serve as an exit port for removing debris retained within bag 31 as well as an opening for mounting bag 31 on lawn equipment with larger sized discharge openings. A secondary cinch cord (not shown) extends within a hem, or reinforced channel, 49 formed in bag around the periphery of secondary opening 43, as seen most clearly in FIG. 5. By pulling upon the externally accessible free ends of the secondary cinch cord, the diameter of secondary opening 43 can be reduced to a generally enclosed condition. The drawstring can then be retained in its pulled state by winding the free ends tightly around an enlarged rectangular cleat 51 affixed to collection bag 13 in close proximity to hem 49.

Adapter Kit 33

As referenced briefly above, adapter kit 33 is provided as means for connecting collection bag 31 to lawn mower 13. As will be described in detail below, adapter kit 33 is universal in its design and thereby enables collection bag 31 to be utilized with a wide variety of different types and styles of lawn equipment, which is a principal object of the present invention.

Referring back to FIGS. 1 and 2, adapter kit 33 comprises a discharge chute 53 and a frame, or mount, 55. As will be described further below, discharge chute 53 establishes a continuous discharge communication path between mower 13 and collection bag 31. Additionally, frame 55 is fixedly coupled to mower 13 and serves, inter alia, as a mounting structure for discharge chute 53, collection bag 31 and shield 35.

Figure 5:
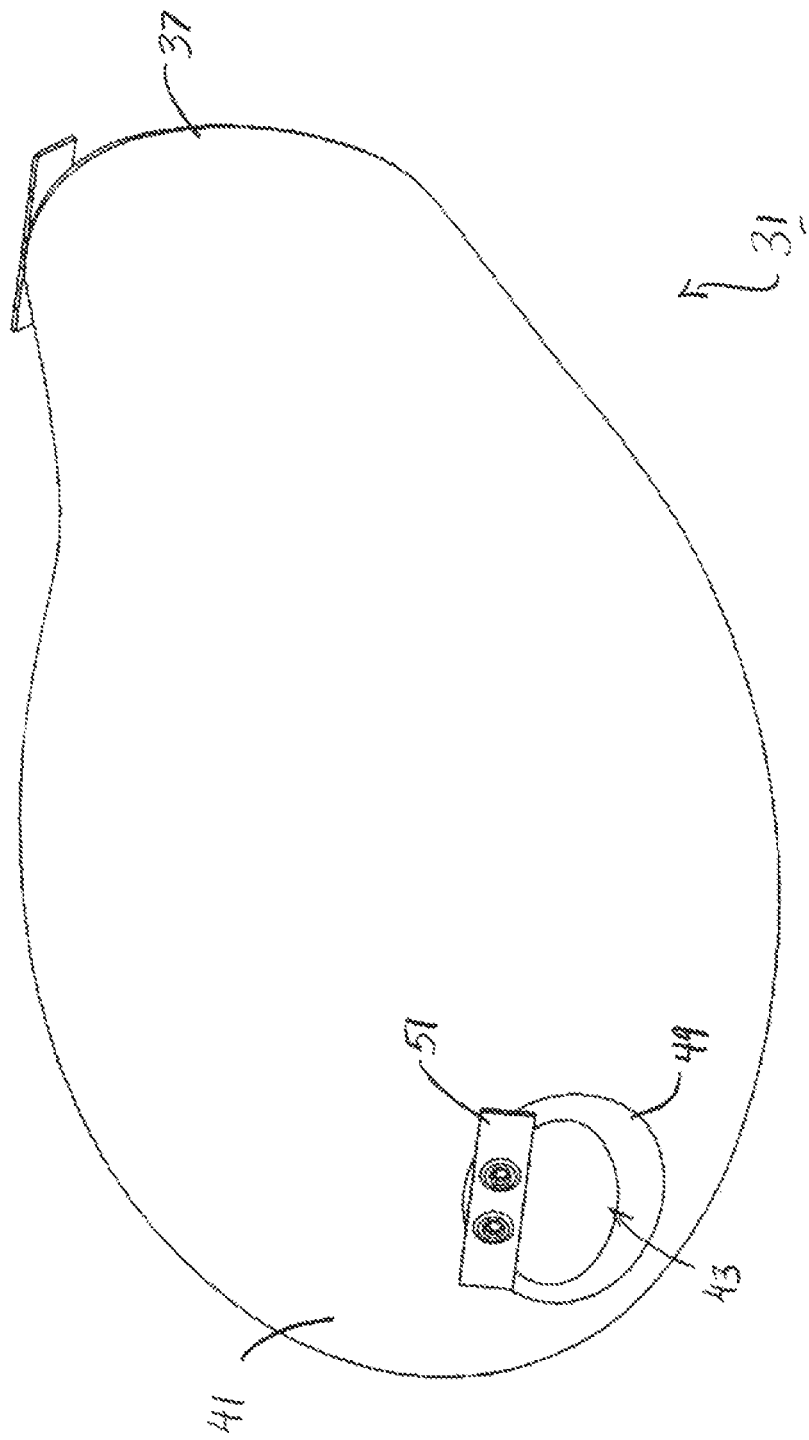
FIG. 5 is an enlarged, rear perspective view of the collection bag shown in FIG. 1.
Figure 6:
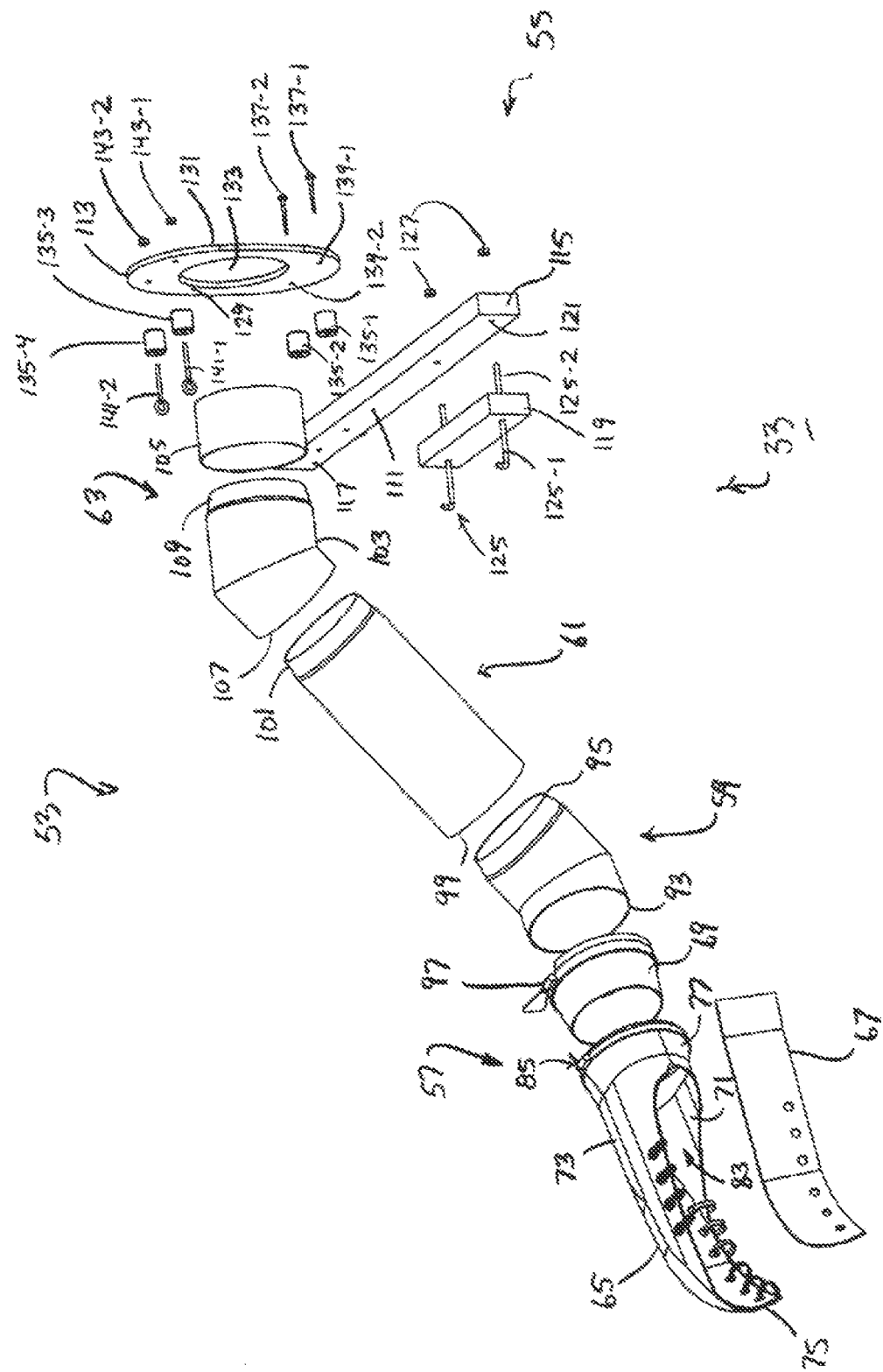
FIG. 6 is a right side, exploded, perspective view of the adapter kit shown in FIG. 1.

As seen most clearly in FIGS. 5 and 6, discharge chute 53 includes primary, secondary, tertiary and quaternary sections 57, 59, 61 and 63 that are coupled, end-to-end, to form a continuous, generally, tubular duct. It is to be understood that the multi-sectioned construction of discharge chute 53 allows for, inter alia, periodic disassembly (e.g., for clearing clogged debris or storage), selective component replacement (e.g., to repair inadvertent damage to one or more sections) as well as reduced packaging constraints and, consequently, serves as a principal novel feature of the present invention.

It should also be noted that chute 53 is not limited to the particular number and arrangement of sections set forth above, Rather, it is to be understood that chute 53 could be constructed with an alternative number and/or arrangement of sections without departing from the spirit of the present invention.

Primary section 57 is designed to be coupled to blade deck 21 of mower 13 over discharge opening 29, which will be explained in detail further below. As can be seen, primary section 57 includes a flexible, generally conical, outer layer 65, a rigid, planar inner layer 67 and a cylindrical collar 69. As will be described further below, the flexible nature of outer layer 65 enables primary section 57 to be mounted over a wide variety of differently configured mower discharge openings, thereby rendering system 11 universal in nature and adaptable for use with a wide range of distinctly designed equipment, which is a principal feature of the present invention.

Outer layer 65 of primary section 57 is formed using a flexible sheet of material, such as nylon, that includes an interior surface 71, an exterior surface 73, a narrow first end 75, a widened second end 77, and opposing side edges 79 and 81 that taper outwardly from first end 75 to second end 77. As part of the assembly process, the sheet-like initial construct of outer layer 65 is formed into a curved, generally C-shaped configuration so as to define an enlarged, widened entry port 83 and a narrower exit port 85 that is generally circular in transverse cross-section.

An upper set of grommet holes 87-1 is formed into outer layer 65 along side edge 79. Similarly, a lower set of grommet holes 87-2 is formed into outer layer 65 along side edge 81. As will be described further below, cable tie-type fasteners 89 are inserted through holes 87 and are utilized to secure outer layer 65 to mower 13 with entry port 83 mounted firmly over discharge opening 29 on mower 13, as will be described further in detail below.

Inner layer 67 is formed using at least one generally planar member constructed of a relatively stiff, rigid and durable material, such as a high density, 1/16 inch thick, polyethylene, that is directly affixed to interior surface 71 of outer layer 65 using a plurality of fastening elements (not shown), such as a rivets or a complementary bolt and nut pairing.

Cylindrical collar 69 is disposed within exit port 85 defined by outer layer 65 and is constructed using a relatively stiff, rigid and durable planar strip of material, such as a high density, 1/16 inch thick, polyethylene. To form collar 69, the planar strip of material is manually bent into its cylindrical shape and held in place by inserting a rivet (not shown) through the overlapping free ends. Outer layer 65 is then secured in place over cylindrical collar 69 by wrapping and tightening an enclosable hose clamp 91 around both collar 69 and outer layer 65. With clamp 91 secured in this fashion, it is to be understood that collar 69 helps maintain the circular cross-sectional shape of exit port 85.

As will be described further below, the multi-layered construction of primary section 57 introduces a number of distinct advantages.

As a first advantage, as referenced briefly above, the flexible nature of outer layer 65 at entry port 83 enables primary section 57 of adapter kit 33 to be easily secured to a wide variety of differently sized and shaped discharge openings, thereby rendering system 11 more universal in use. By contrast, traditional collection systems are more rigid in nature and therefore usable with a limited range of machines (e.g., a single style of riding lawn mower).

As a second advantage, the flexible construction of outer layer 65 and the initial planar construction of inner layer 67 and collar 69 enable primary section 57 to be collapsed into a compact and essentially flat shipping package.

As a third advantage, the stiff and durable nature of inner layer 67 serves as a structural reinforcement to primary section 65. As a result, any sharp, hard or otherwise potentially harmful debris discharged by mower (e.g., rocks) would be deflected by inner layer 67, thereby protecting the less durable outer layer 65 from ripping or tearing.

Secondary section 59 is preferably a commercially available, 7 inch diameter, 90 degree, sheet metal, elbow duct that includes an open first end 93 and an open second end 95 that has a slightly reduced outer diameter for mating purposes. Secondary section 59 is preferably purchased separately by the user (e.g., at a local hardware store to limit shipping and packaging requirements) and reoriented into an approximate 45 degree angle (or simply purchased as a 45 degree elbow duct). As part of the assembly process, first end 93 of secondary section 59 is telescopingly mounted within inner collar 69 to create a continuous discharge communication path therebetween, secondary section 59 being retained within collar 69 using an outer circumscribing hose clamp 97.

Tertiary section 61 is preferably a commercially available, 7 inch diameter, straightened, sheet metal, rigid tubular duct that includes an open first end 99 and an open second end 101 that has a slightly reduced outer diameter for mating purposes. Tertiary section 61 is preferably purchased separately by the user (e.g., at a local hardware store to limit shipping and packaging requirements). As part of the assembly process, first end 99 of tertiary section 61 is telescopingly mounted over second end 95 of secondary section 59 through a mating fitted relationship to create a continuous discharge communication path therebetween.

Quaternary section 63 preferably includes a commercially available, 7 inch diameter, 90 degree, sheet metal, elbow duct 103 and a collar 105. Elbow duct 103, which includes an open first end 107 and an open second end 109 with a slightly reduced outer diameter for mating purposes, is preferably purchased separately by the user (e.g., at a local hardware store to limit shipping and packaging requirements) and is reoriented into an approximate 45 degree angle (or simply purchased as a 45 degree elbow duct). As part of the assembly process, first end 107 of elbow duct 103 is telescopingly mounted over second end 101 of tertiary section 61 through a mating fitted relationship to create a continuous discharge path therebetween. Similarly, collar 105 is telescopingly mounted over second end 109 of elbow duct 103 through a mating fitted relationship and serves an exit port for discharge chute 53.

Figure 8:
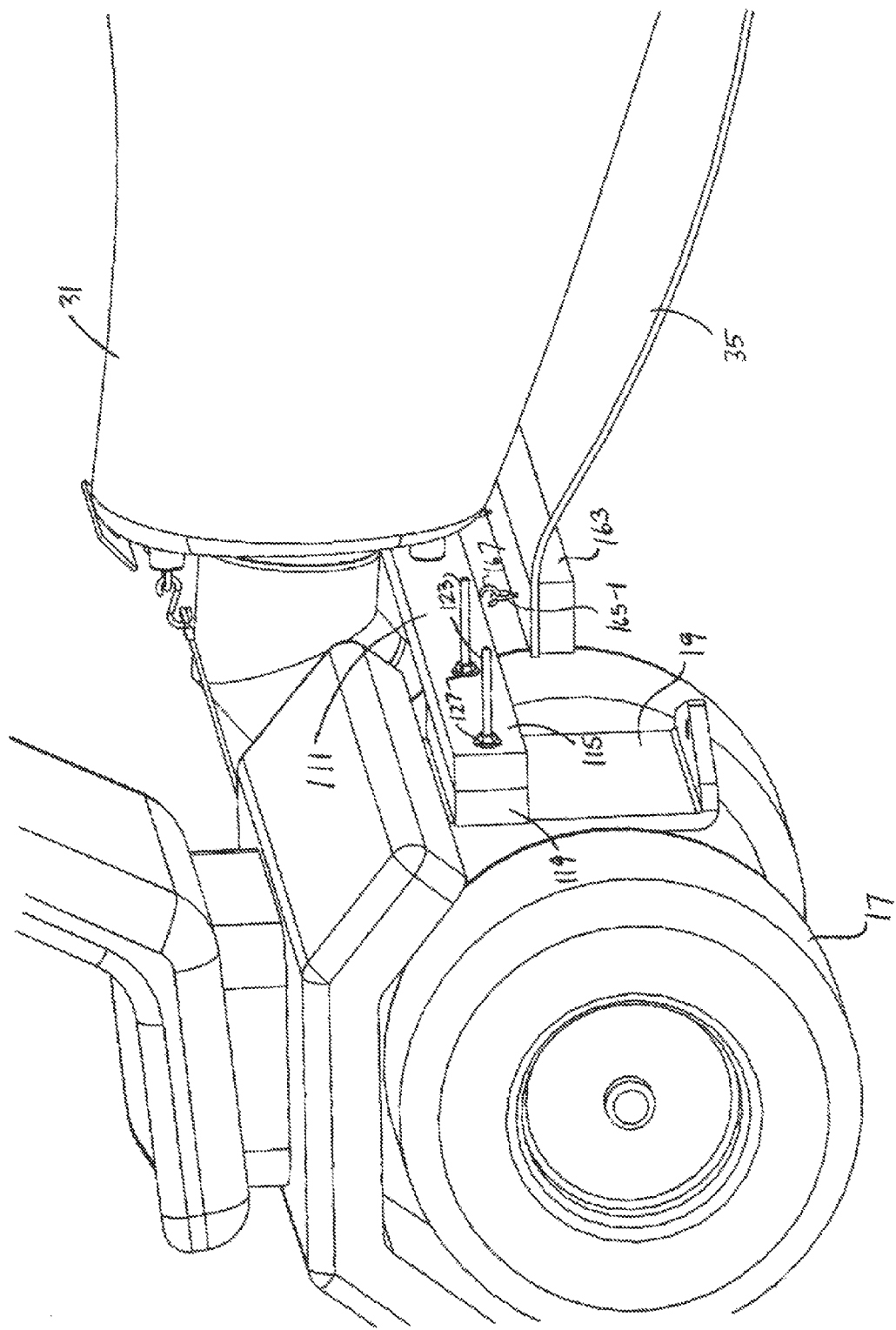
FIG. 8 is an enlarged, fragmentary, rear perspective view of the lawn waste collection system and prior art riding lawn mower shown in FIG. 1.
Figure 9:
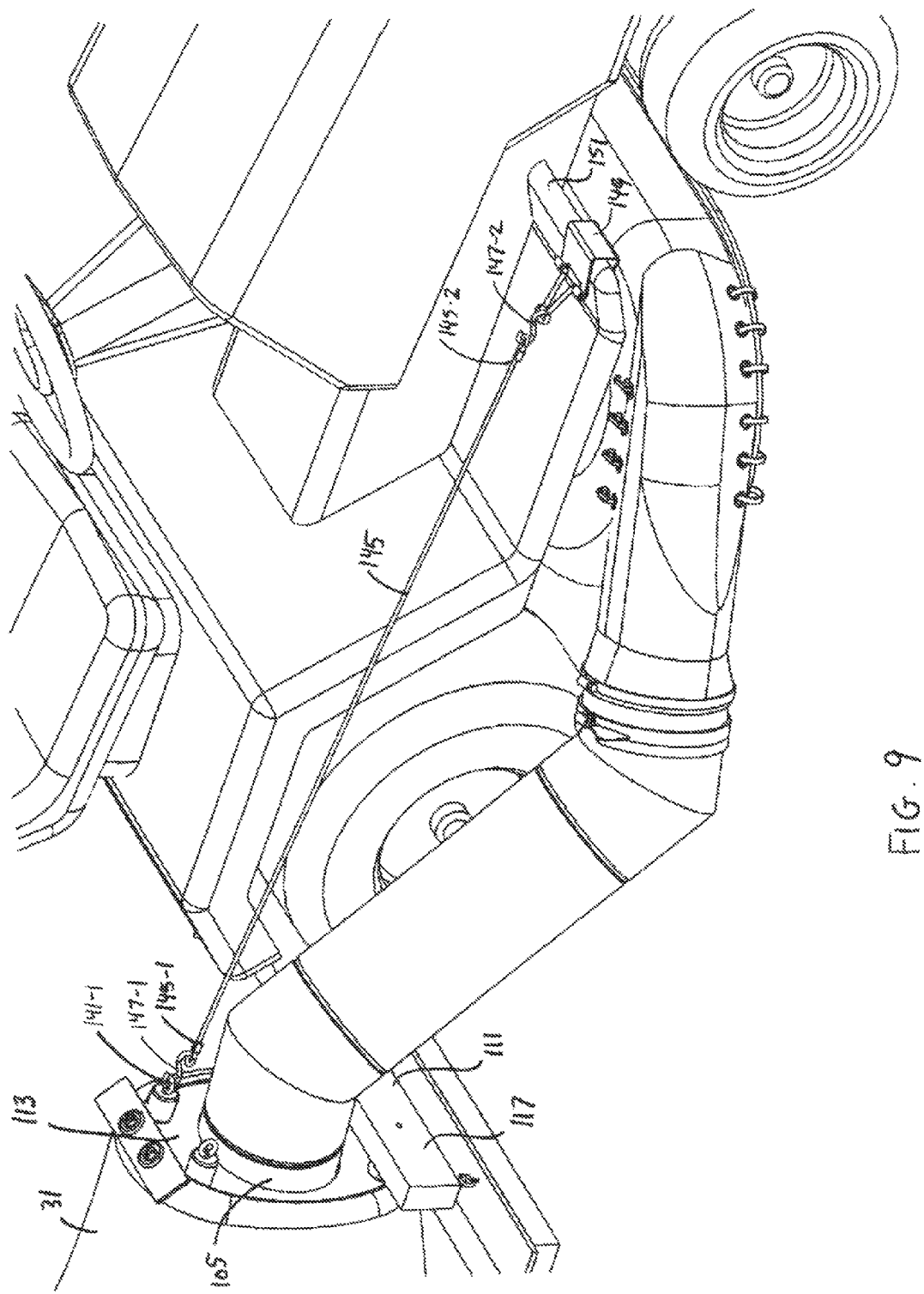
FIG. 9 is an enlarged, fragmentary, front perspective view of the lawn waste collection system and prior art riding lawn mower shown in FIG. 1.

As referenced briefly above, frame 55 is fixedly coupled to mower 13 and serves, inter alia, as a mounting structure for discharge chute 53, collection bag 31 and shield 35. Referring now to FIGS. 6, 8 and 9, frame 55 comprises a laterally disposed support arm 111 mounted to back plate 19 of mower 13 and an oval restraining plate 113 coupled to support arm 111 for joining collar 105 (i.e., the exit port of discharge chute 53) with collection ball 31.

Support arm 111 is preferably in the form of a 2"×3" wooden stud with a first end 115 coupled to back plate 19 and a second end 117 that extends laterally out from the rear of mower 13. In the present embodiment, a single, reduced length, 2"×3" wooden spacer 119 is shown disposed between support arm 111 and back plate 19 to create necessary clearance between support arm 111 and rear tires 17 of mower 13. However, it is to be understood that spacer 119 is an optional component and, as a result, could be eliminated from frame 55 if not required. Additionally, it should be noted that additional spacers 55 could be stacked front-to-back between back plate 19 and support arm 111 if additional wheel clearance is needed.

Both support arm 111 and optional spacer 119 are preferably formed using conventional wooden studs that are readily commercially available. In this capacity, the user can purchase these larger components separately (e.g., at a local hardware store) and thereby limit the overall size and packaging of adapter kit 33, which is a principal object of the present invention.

As part of the primary assembly process, arm 111 and intermediate spacer 119 are disposed against back plate 19. Using a drill or another similar instrument, bores 121 are formed in both support arm 111 and spacer 119 in axial alignment with the preformed holes in back plate 19. A pair of fastening elements 123 is then inserted through bores 121 to secure spacer 119 and arm 111 to back plate 19.

Each fastening element 123 is represented herein as comprising a J-shaped bolt 125 and a corresponding threaded nut 127. Preferably, bent end 125-1 of bolt 125 is disposed flat against the interior surface of back plate 19 so that the straightened, threaded end 125-2 of bolt 125 is externally exposed. Complementary nut 127 is then threadingly mounted onto end 125-2 to retain support arm 111 firmly in place, as shown in FIG. 8. It should be noted that, due to its J-shaped configuration, each bolt 125 lies flush against back plate 19 and is thereby precluded from interfering with interior components of mower 13.

Restraining plate 113 is mounted onto second end 117 of support arm 111. Plate 113 is preferably in the form of a thin, oval-shaped member that is constructed out of a rigid and durable material, such as steel. Plate 113 includes flattened inner and outer surfaces 129 and 131 and is shaped to define a circular central opening 133. As seen in FIG. 9, central opening 133 is dimensioned to fittingly receive free end of collar 105.

For reasons to become apparent below, a lower pair of generally cylindrical spool-shaped elements, or spools, 135-1 and 135-2 is disposed between inner surface 129 of plate 113 and support arm 111. In turn, a pair of screws 137-1 and 137-2 is driven through a complementary pair of preformed circular holes 139-1 and 139-2, respectively in plate 113, through lower pair of spools 135-1 and 135-2, respectively, and into engagement with support arm 111. As such, plate 113 is firmly secured to support arm 111.

Additionally, an upper pair of generally cylindrical spool-shaped elements, or spools, 135-3 and 135-4 is secured against inner surface 129 of plate 113. Upper spools 135-3 and 135-4 are retained against plate 113 using eye bolts 141-1 and 141-2, respectively, as well as complementary eye bolt nuts 143-1 and 143-2, respectively. In use, eye bolts 141 can be used to counterbalance rearward pivotal forces applied to plate 113 from collection bag 31 as debris accumulates therein. Specifically, as seen in FIG. 9, a cord, or cable, 145 is provided that includes a first end 145-1 that is secured to eye bolt 141-1 via a first snap hook-type fastening element 147-1. Cord 145 additionally includes a second end 145-2 that is secured to a fixed binder 149 fittingly slid over an angled footrest 151 on mower 13 via a second snap hook-type fastening element 147-2, In this manner, the tension in cord 145 continuously applies a forward application of force on the top of plate 113 that counterbalances the rearward application of force on the top of plate 113 from the weight of collection bag 31.

Shield 35

As seen most clearly in FIGS. 1 and 8, shield 35 is designed to drag behind mower 13 and is dimensioned to support collection bag 31 directly thereon. In this capacity, shield 35 protects collection bag 31 from frictional wear other similar damage resulting from direct contact against the ground surface, which is particularly useful when the ground surface is roughened (e.g., a gravel surface, driveway or surface with numerous rocks).

Figure 10:
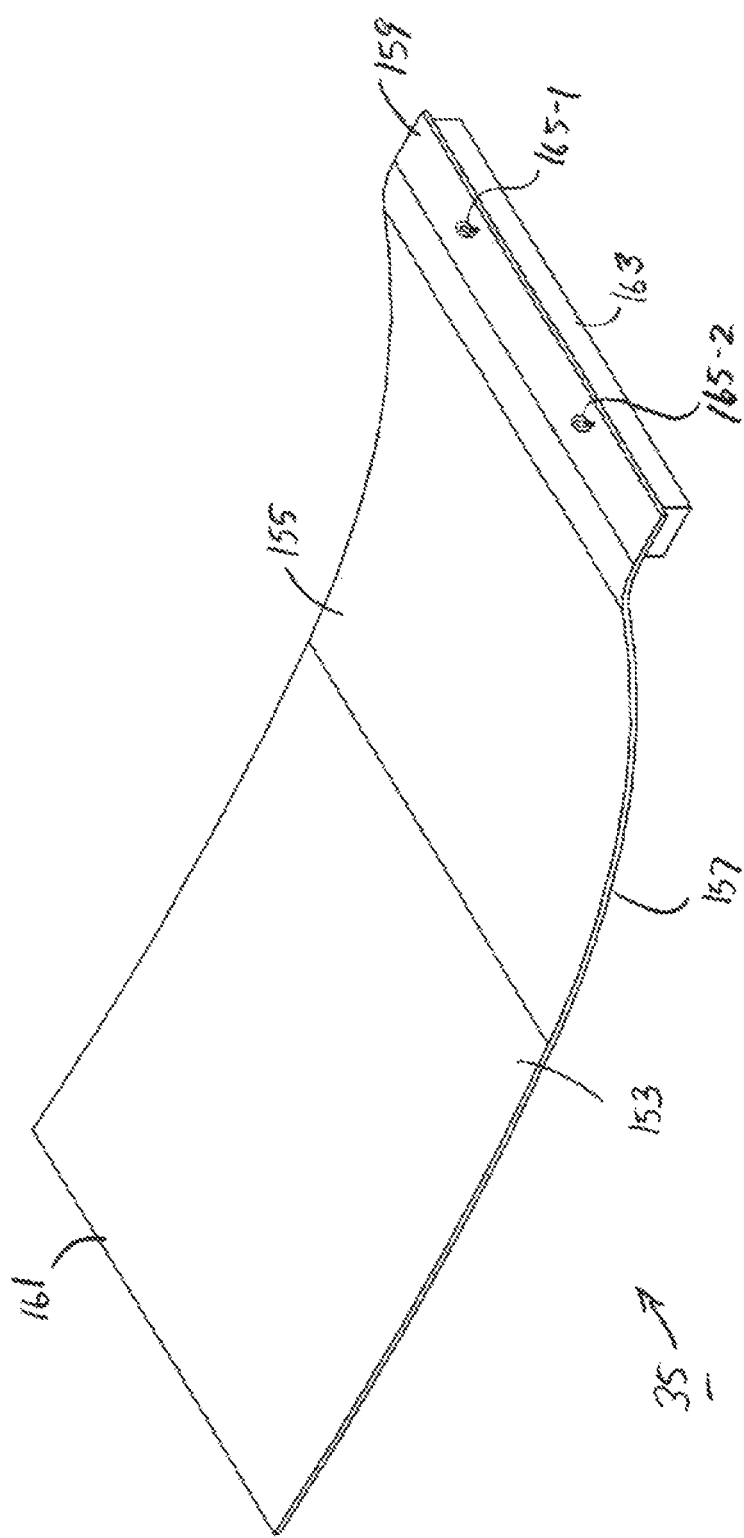
FIG. 10 is a front perspective view of the shield shown in FIG. 1.

Referring now to FIG. 10, shield 35 includes an enlarged, flattened, rectangular, generally planar sheet, or membrane, 153 that includes a top surface 155, a bottom surface 157, a leading edge 159 and a trailing edge 161. Preferably, shield 35 is constructed out of a rigid and durable material, such a vinyl material of the type commonly used in flooring applications. Additionally, it is preferred that bottom surface 157 has a low coefficient of friction (e.g., through selection of a particular material for membrane 153 or through the application of a low friction coating thereon) to minimize resistance or drag.

A reinforcement bar 163 is transversely secured to bottom surface 157 along leading edge 159. Reinforcement bar 163 is preferably in the form of a 2"×3" wooden stud that is cut to the width of sheet 153.

A pair of spaced apart screw eyes 165-1 and 165-2 is driven vertically down through sheet 153 along leading edge 159 and into threaded engagement with reinforcement bar 163. As seen most clearly in FIG. 8, screw eyes 165 are designed to be removably connected to a corresponding pair of hooks 167 that extend downward from support arm 111. As such, shield 35 can be fixedly coupled to support arm 111 so as to drag directly behind mower 13.

Figure 11:
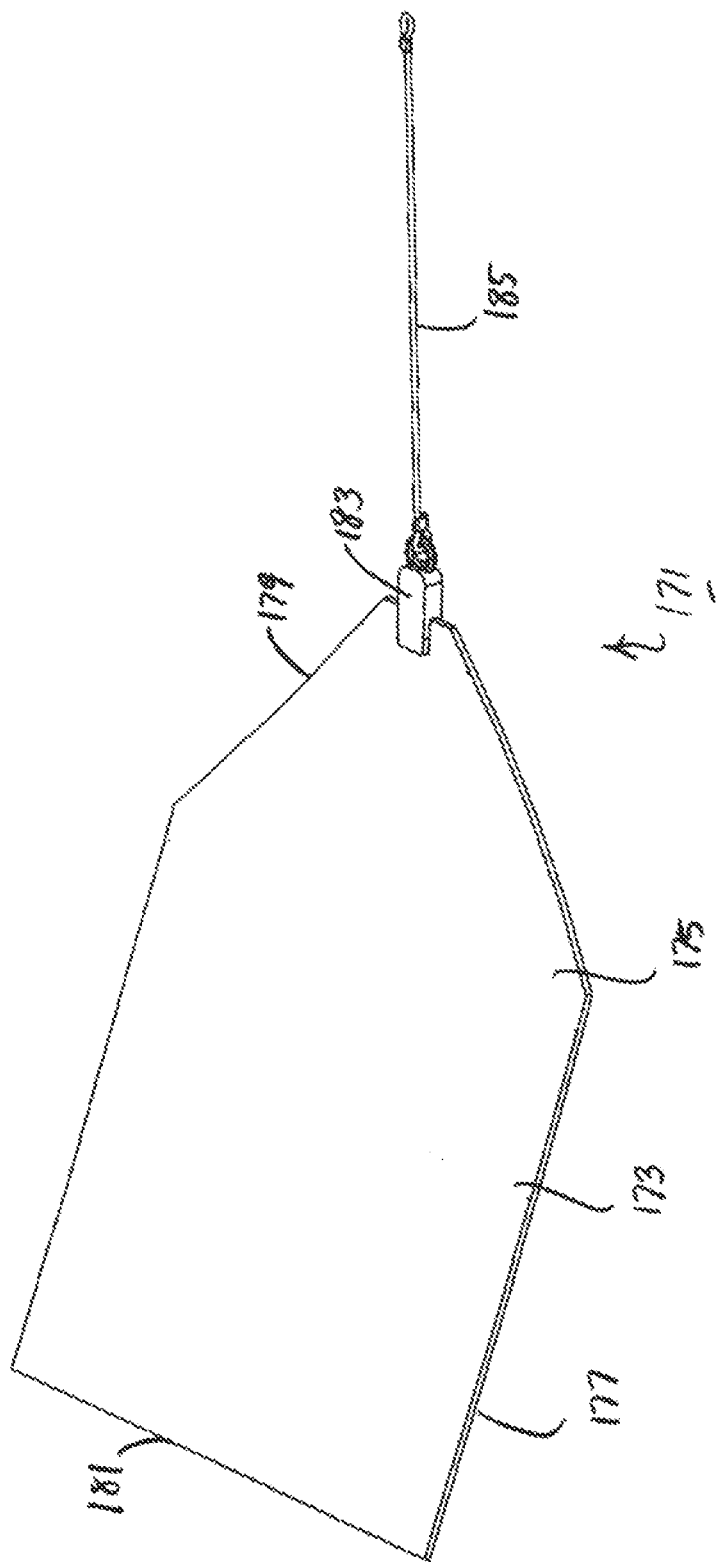
FIG. 11 is a front perspective view of a modified version of the shield shown in FIG. 10.

It is to be understood that the particular design of shield 35 as well as its means of connection with mower 13 could be modified without departing from the spirit of the present invention. Specifically, referring now to FIG. 11, there is shown an alternatively designed shield 171 that can be used in system 11 in place of shield 35.

As can be seen, shield 171 includes an enlarged, flattened, generally planar sheet, or membrane, 173 that includes a top surface 175, a bottom surface 177, a narrow, inwardly tapering leading edge 179 and a widened trailing edge 181. Preferably, shield 171 is similar to shield 35 in that shield 171 is constructed out of a rigid and durable material, such a vinyl material of the type commonly used in flooring applications. Additionally, it is preferred that bottom surface 177 has a low coefficient of friction (e.g., through the application of a low friction coating thereon) to minimize resistance or drag.

Shield 171 additionally includes a tarp clip 183 that can be releasably secured to narrow leading edge 179 of sheet 173. An elongated cord 185 is then coupled at one end to clip 183 and at its opposite end to mower 13 at a location that is preferably in direct alignment beneath chute 53.

Due to its construction, shield 171 is able to pivot laterally relative to mower 13. In this capacity, as mower 13 turns, any resultant lateral movement experienced by collection bag 31 is mirrored by shield 171. As a result, shield 171 continuously tracks beneath collection bag 31 during operation of mower 13, thereby ensuring collection bag 31 is adequately protected.

Installation and Use of Lawn Waste Collection System 11

Referring back to FIGS. 1 and 2, system 11 is designed to be used in the following manner to facilitate the collection of lawn waste, such as leaves, grass clippings and the like. However, prior to its use in collecting lawn waste, system 11 must be properly installed onto mower 13.

As part of the installation process, support arm 111 is fixedly coupled to mower 13 in the manner set forth in detail above. Specifically, laterally oriented support arm 111 is fixedly secured to back plate 19 using fastening elements 123, with one or more spacers 119 disposed between support arm 111 and back plate 19 if clearance is required from rear tires 17 of mower.

Figure 7:
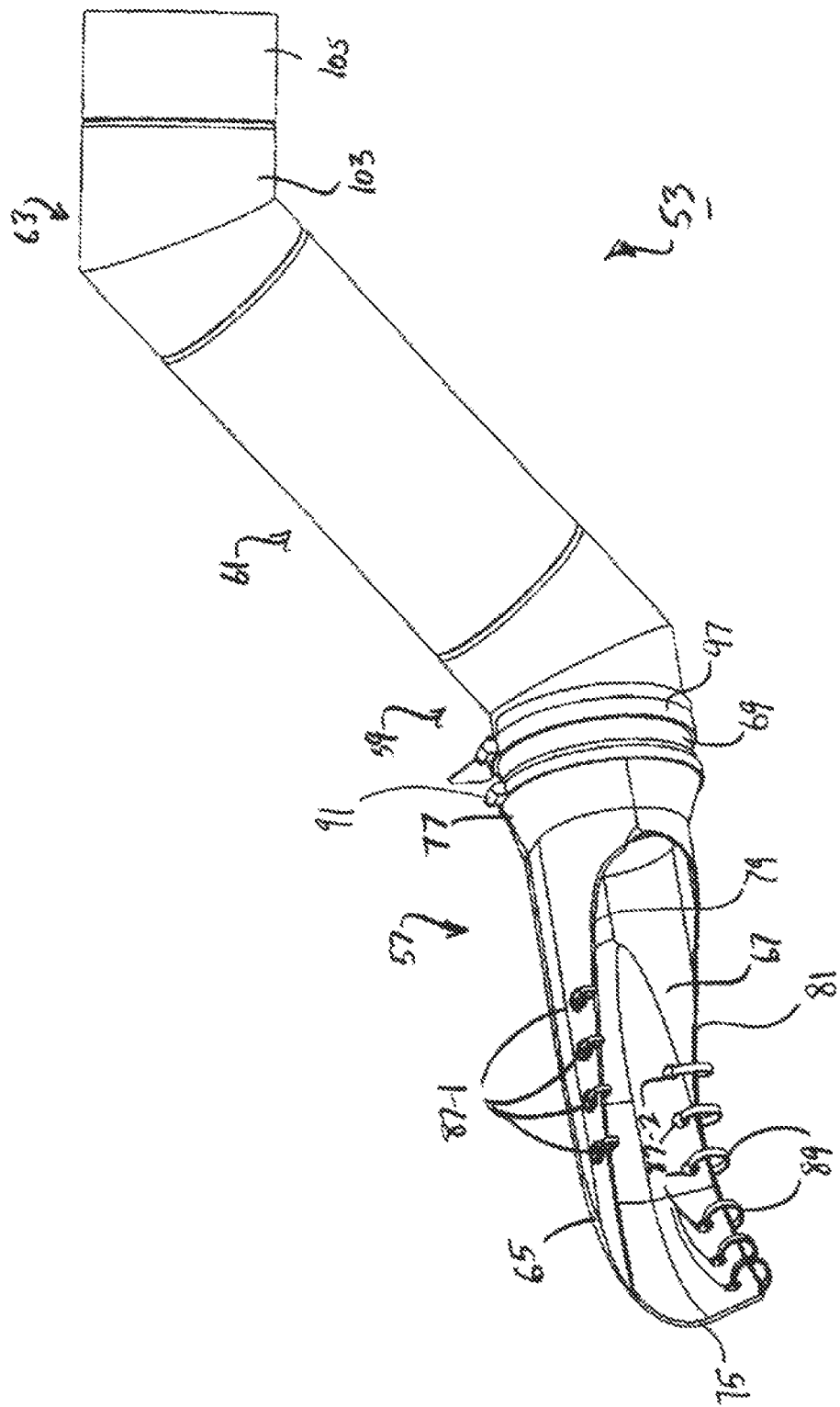
FIG. 7 is a right side, assembled, perspective view of the discharge chute shown in FIG. 6.

With support arm 111 mounted as such, primary section 57 of discharge chute 53 is assembled and mounted onto blade deck 21 of mower 13, Specifically, as seen most clearly in FIGS. 6 and 7, generally planar inner layer 67 is rolled up tightly about its longitudinal axis and subsequently released so as to permanently impart curvature therein. Similarly, collar 69 is rolled into a cylindrical structure and retained as such using rivets. Inner layer 67 and collar 69 are then secured to outer layer 65 in the manner as explained above to form primary section 57.

Assembled primary section 57 is then secured to blade deck 21 of mower 13 over discharge opening 29. As seen most clearly in FIG. 12, entry port 83 is disposed over discharge opening 29 in blade deck 21, the flexible nature of outer layer 65 enabling an adequate seal to be created over discharge openings of different dimensions, thereby rendering kit 33 universal in nature. To secure primary section 57 to blade deck 21, a plurality of cable tie-type fasteners 89 is passed through discharge opening 29, wrapped around lip 27, inserted through lower grommet holes 87-2, and formed into tightened, self-enclosed loops.

Figure 3:
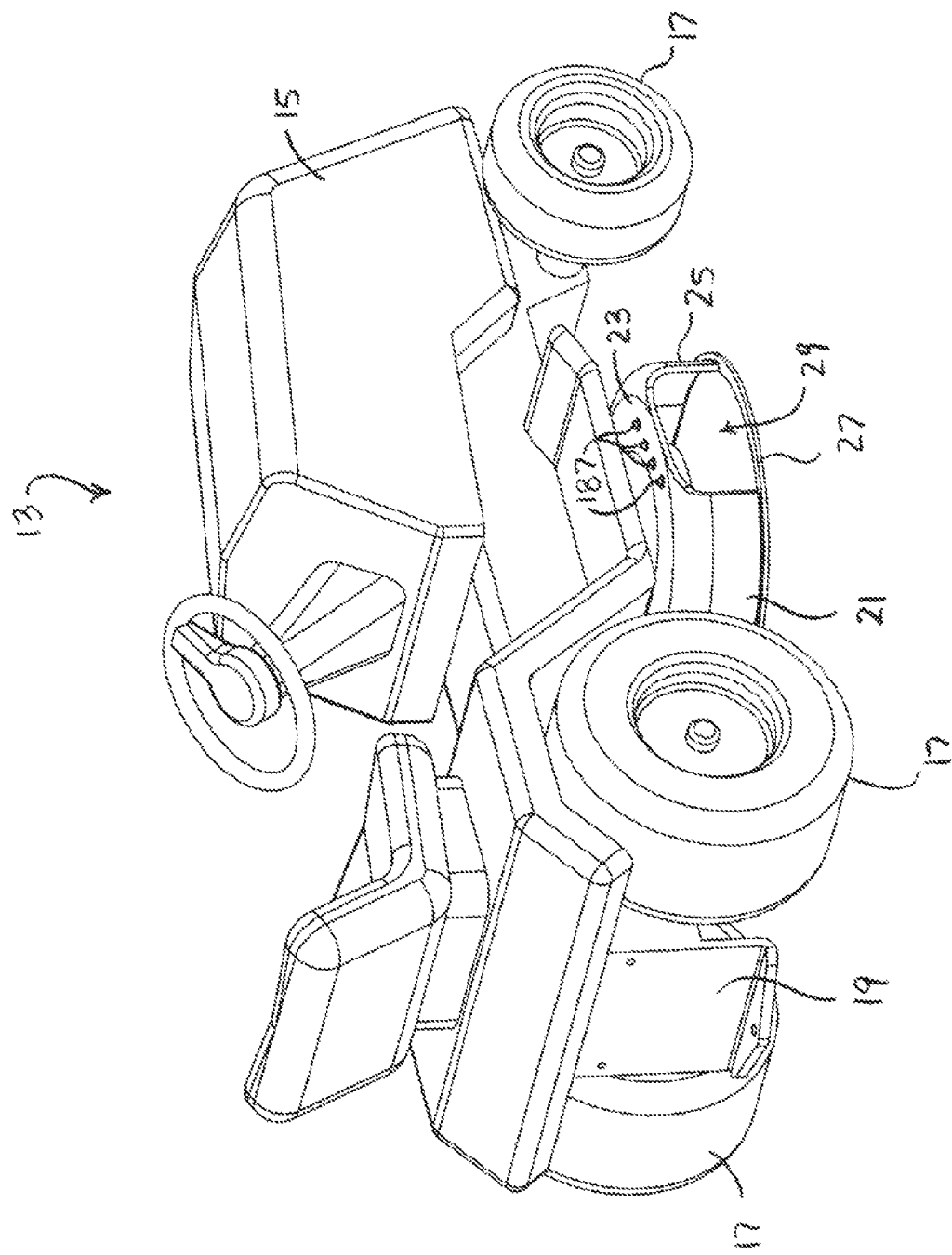
FIG. 3 is an enlarged, right side view of the prior art riding lawn mower shown in FIG. 1, the prior art riding lawn mower being shown with a plurality of the cable tie mounts from the lawn waste collection system of the present invention mounted on the top surface of the mower blade deck.

For reasons to become apparent below, adapter kit 33 additionally includes a plurality of cable tie mounts 187 that is mounted on top wall 23 of blade deck 21 in a linear arrangement proximate discharge opening 29, as seen most clearly in FIG. 3. Accordingly, as part of the process of securing primary section 57 to blade deck 21, a plurality of cable tie-type fasteners 89 is passed through mounts 187, through upper grommet holes 87-1, and formed into tightened, self-enclosed loops, as shown FIG. 12. In this manner, entry port 83 in primary section 57 encloses discharge opening 29 in blade deck 21.

Figure 12:
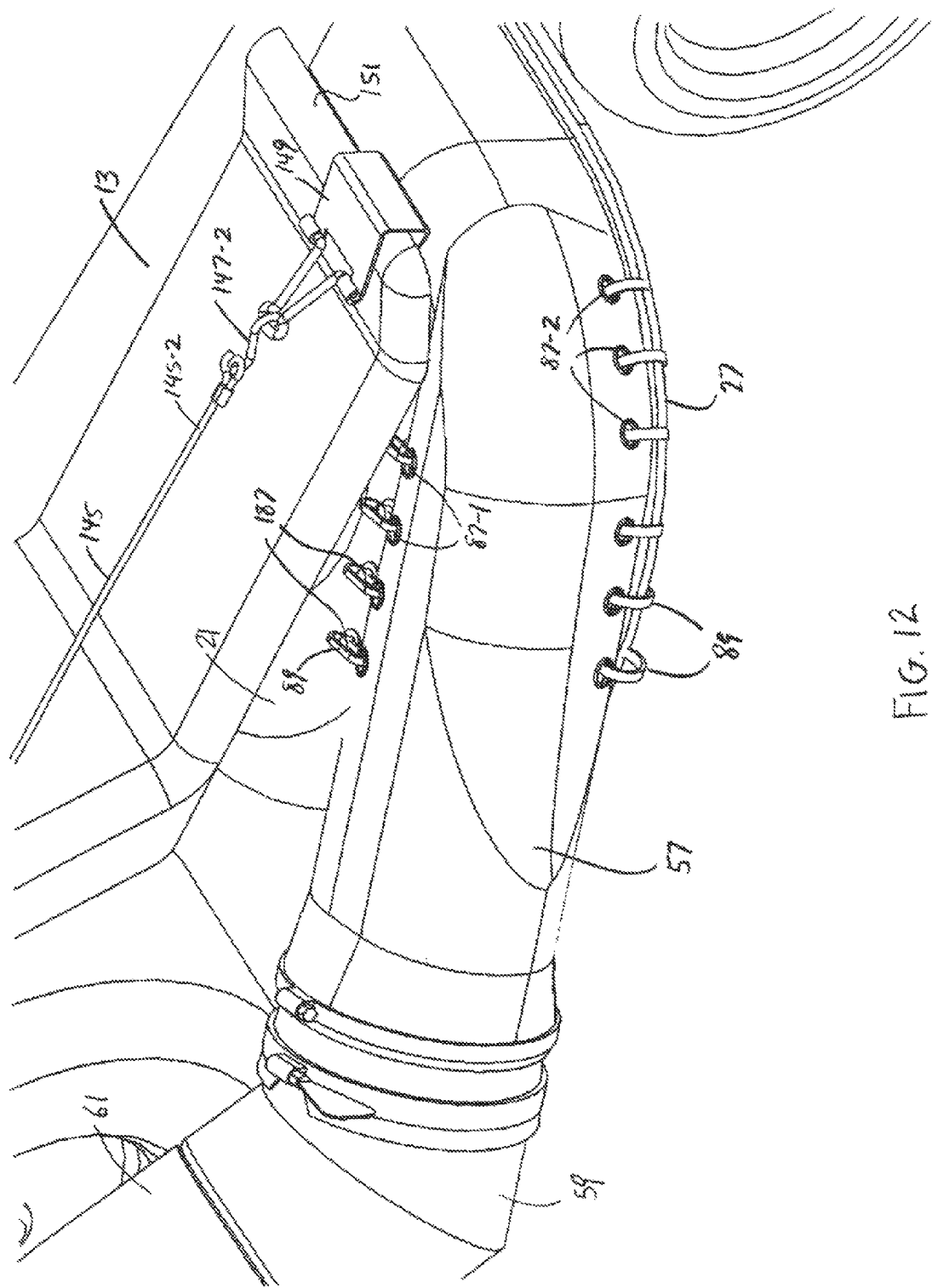
FIG. 12 is an enlarged, fragmentary, front perspective view of the lawn waste collection system and prior art riding lawn mower shown in FIG. 1, which is particularly useful in understanding the connection of the discharge chute to the mower blade deck.

As seen most clearly in FIGS. 1 and 12, secondary, tertiary and quaternary sections 59, 61 and 63 are assembled, as needed, and are coupled to mounted primary section 57 in the manner set forth in detail above to create continuous discharge chute 53. Binder 149 is then clipped to angled footrest 151 on mower 13 and is coupled to second end 145-2 of cord 145 via hook-type fastening element 147-2.

Figure 13:
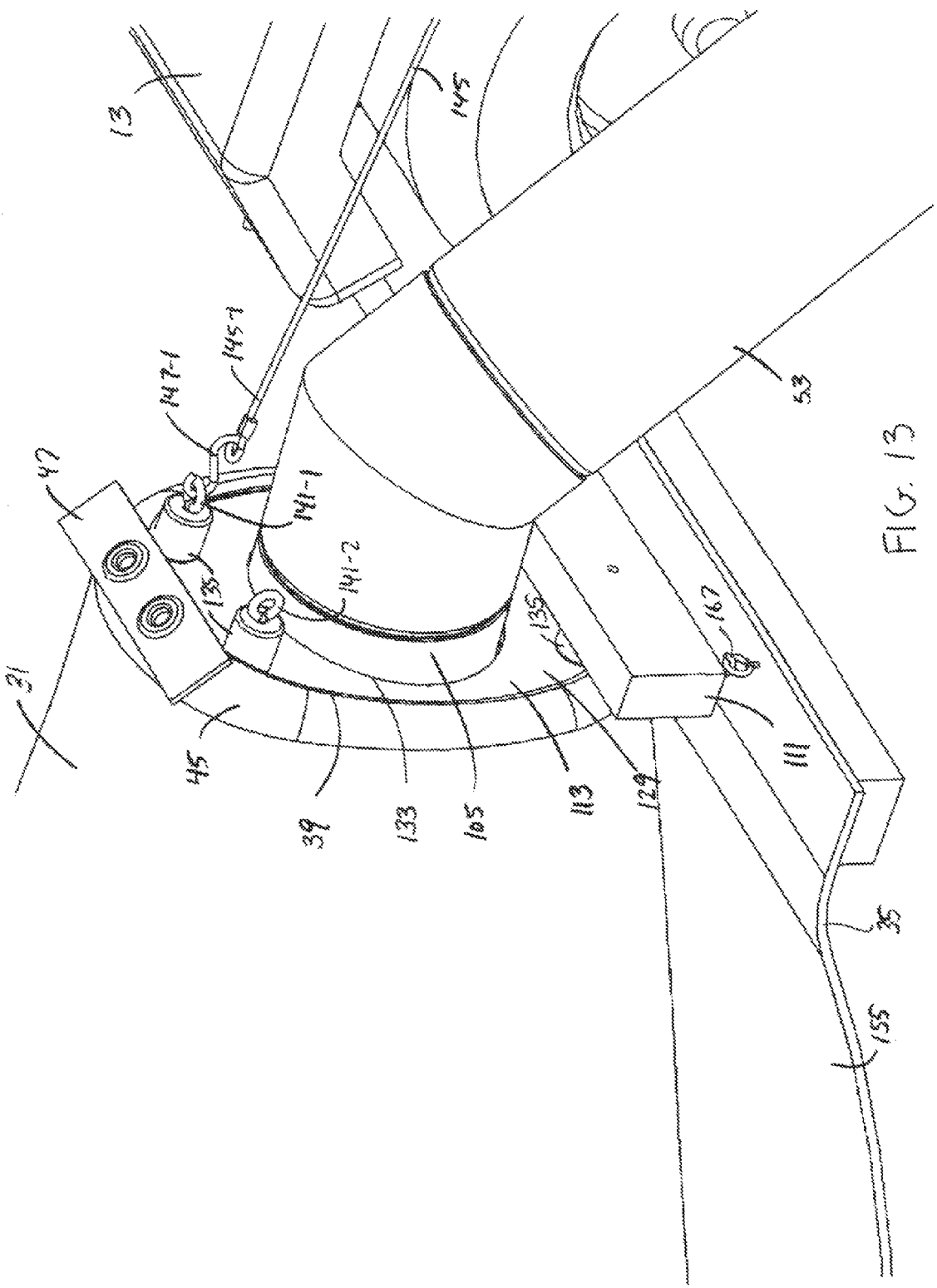
FIG. 13 is an enlarged, fragmentary, front perspective view of the lawn waste collection system and prior art riding lawn mower shown in FIG. 1, which is particularly useful in understanding the connection of the collection bag to the adapter kit.

Referring now to FIG. 13, restraining plate 113 is mounted onto discharge chute 53 such that collar 105 penetrates through central opening 133. With lower spools 135 positioned on inner surface 129, plate 113 is permanently secured to support arm 111 by screws 137. Upper spools 135 are similarly secured to inner surface 129 of plate 123 using eye bolts 141-1 and 141-2. First end 145-1 of cable 145 is then coupled to eye bolt 141-2 via snap hook-type fastening element 147-1 to maintain plate 123 in a vertical orientation.

With adapter kit 33 installed as such, shield 35 is positioned behind mower 13 and is fixedly connected to downwardly projecting hooks 167 on support arm 111. Collection bag 31 is then positioned on top surface 155 of shield 35. With bag 31 positioned as such, primary opening 39 is circumferentially mounted over restraining plate 113, as shown in FIG. 13. By tightly drawing the primary cinch cord (not shown), hem 45 in bag 31 cinches firmly against inner surface 129 of plate 123 in circumferential contact therewith, with spools 135 providing any necessary clearance (e.g., with support arm 111). The free ends of the primary cinch cord are then wound tightly around cleat 47 so as to securely retain collection bag 31 in communication with chute 53.

Using mower 13, the user can ride over the area in need of lawn waste collection. Waste discharged by mower 13 through opening 29 travels through chute 53 and ultimately into the interior of collection bag 31. As collection bail 31 accumulates debris, the majority of the weight of bag 31 is supported by shield 35. Consequently, shield 35 protects hag 31 from wear or other harmful frictional contact against the ground surface.

When desired by the user, debris retained in collection bag 31 can be withdrawn through secondary opening 43, thereby enabling hag 31 to remain connected to chute 53 during the debris emptying process. Accordingly, the enlarged size of collection bag 31 along with relative ease in which system 11 can be installed and used with mower 13 renders system 11 particularly useful in the collection of a considerable quantity of leaves on a designated surface.

It is to be understood that the particular construction of system 11 is intended to be merely exemplary and those skilled in the art shall be able to make numerous variations and modifications to it without departing from the spirit of the present invention. All such variations and modifications are intended to be within the scope of the present invention as defined in the appended claims.

For instance, as referenced briefly above, chute 53 is not limited to the particular number and arrangement of sections set forth above. Rather, it is to be understood that chute 53 could be constructed with an alternative number and/or arrangement of sections without departing from the spirit of the present invention.

Figure 14A:
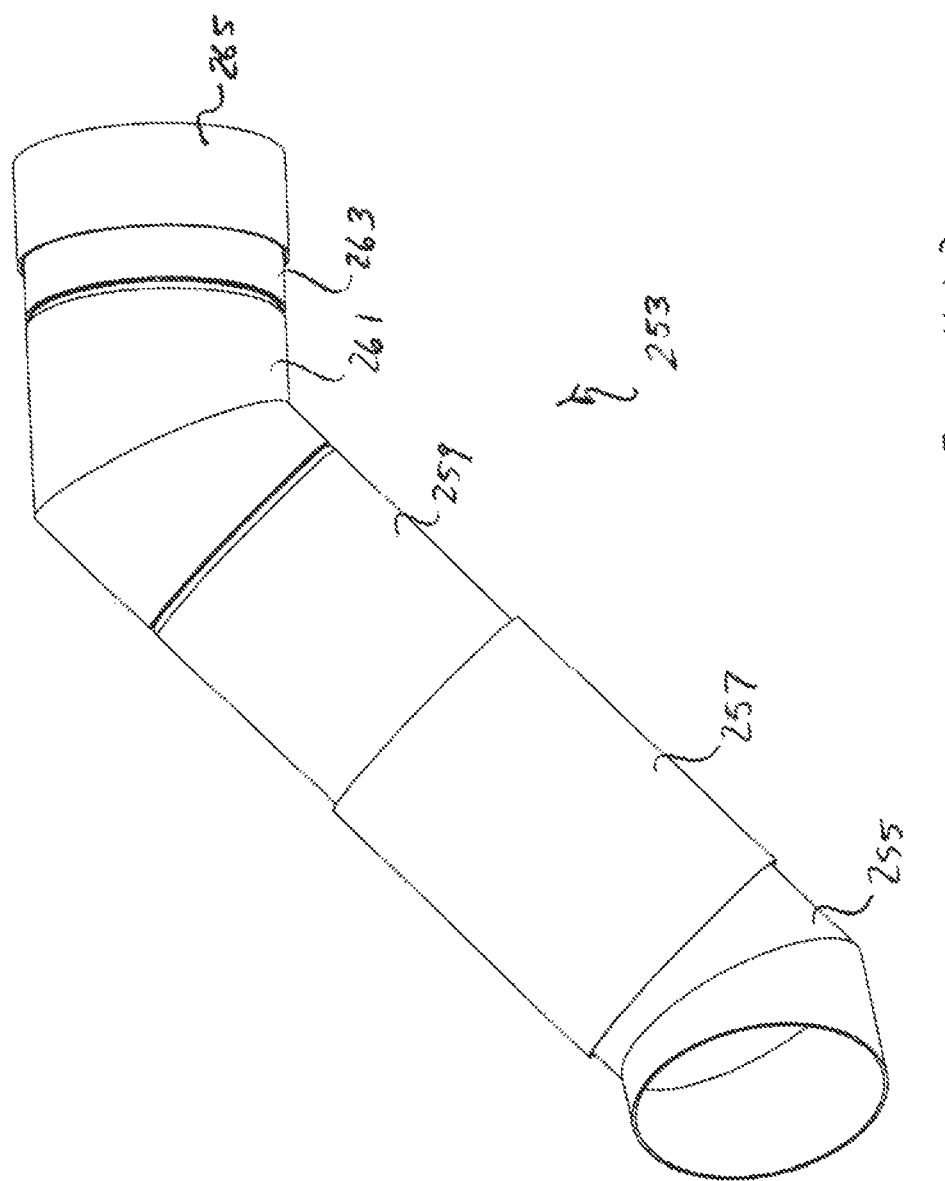
FIGS. 14(a) and 14(b) are assembled and exploded, right side perspective views, respectively, of a modified version of the chute shown in FIG. 7, the modified chute being shown without the primary section for ease of illustration.
Figure 14B:
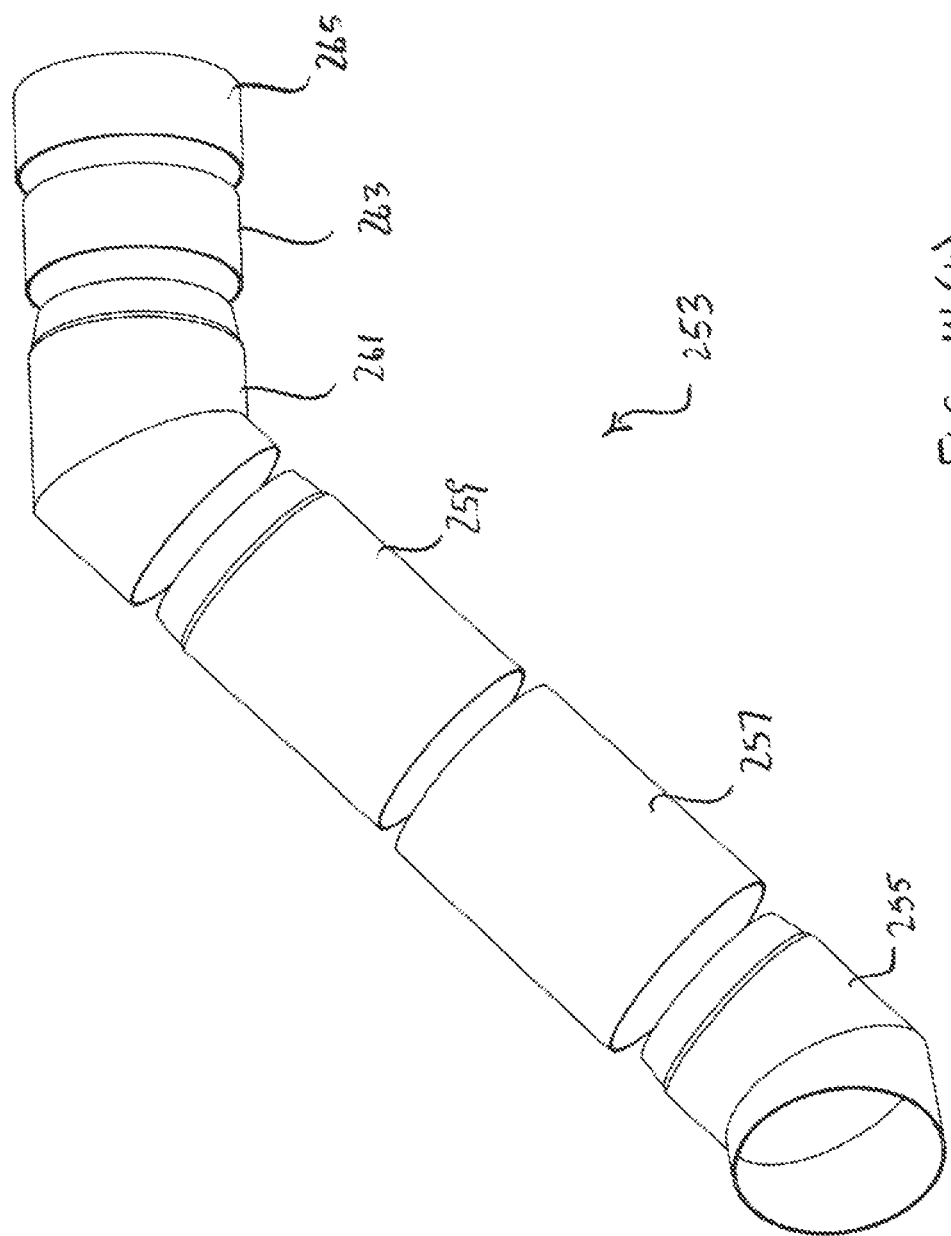

Specifically, referring now to FIGS. 14(a) and 14(b), there are shown assembled and exploded, right side perspective views, respectively, of an alternatively designed chute 253 that can be used in system 11 in place of chute 53, chute 253 being shown without primary section 57 for ease of illustration purposes only.

As can be seen, alternative chute 253 includes additional sections, joined end-to-end in a telescoping fashion, to enable the user to adjust the overall configuration of chute 253 to accommodate the particular design of the lawn mower with which it is to be used. In particular, alternative chute 253 includes a first 45 degree elbow duct 255, a widened straight duct 257, a narrowed straight duct 259, a second 45 degree elbow duct 261, a narrowed collar 263 and a widened collar 265 that are all joined together, end-to-end, in a telescoping fashion. It is to be understood that the slidable telescoping interrelationship between ducts 257 and 259 as well as between collars 263 and 265 enables the length and configuration of chute 253 to be adjusted, as needed.

What is claimed is:

1. A system for use with a lawn mower to collect lawn waste, the lawn mower including an opening through which lawn waste is discharged, the lawn waste collection system comprising:
   (a) a collection bag adapted to retain lawn waste discharged from the lawn mower; and
   (b) an adapter kit adapted to connect the collection bag to the opening in the lawn mower, the adapter kit comprising,
      (i) a discharge chute for establishing a lawn waste discharge path from the lawn mower to the collection bag, the discharge chute having a first end and a second end, and
      (ii) a frame adapted to be fixedly coupled to the mower for supporting the discharge chute and the collection bag, the frame comprising,
         (A) a support arm adapted to be fixedly coupled to the lawn mower, and
         (B) a restraining plate fixedly coupled to the support arm, the restraining plate being spaced apart from the support arm by at least one element, wherein the restraining plate is an oval-shaped member with a flat front surface and a flat rear surface, the restraining plate being shaped to define a central opening that is dimensioned to receive the second end of the discharge chute,
      (iii) wherein the first end of the discharge chute includes an outer layer adapted to mount on the lawn mower over the opening and an inner layer affixed to the outer layer for reinforcement, the outer layer being more flexible than the inner layer.

2. The lawn waste collection system as claimed in claim 1 wherein the collection bag is shaped to define a selectively enclosable primary opening and a selectively enclosable secondary opening.

3. The lawn waste collection system as claimed in claim 2 wherein the primary opening of the collection bag is mounted over the restraining plate.

4. The lawn waste collection system as claimed in claim 3 wherein a cord is connected with tension between the flat front surface of the restraining plate and the lawn mower.

* * * * *